Patented Oct. 5, 1954

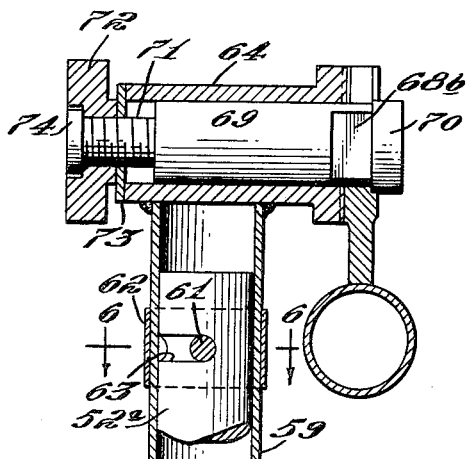
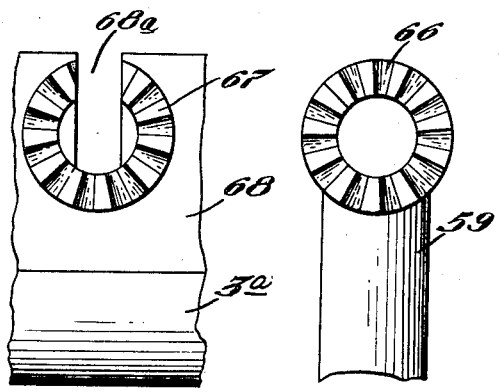
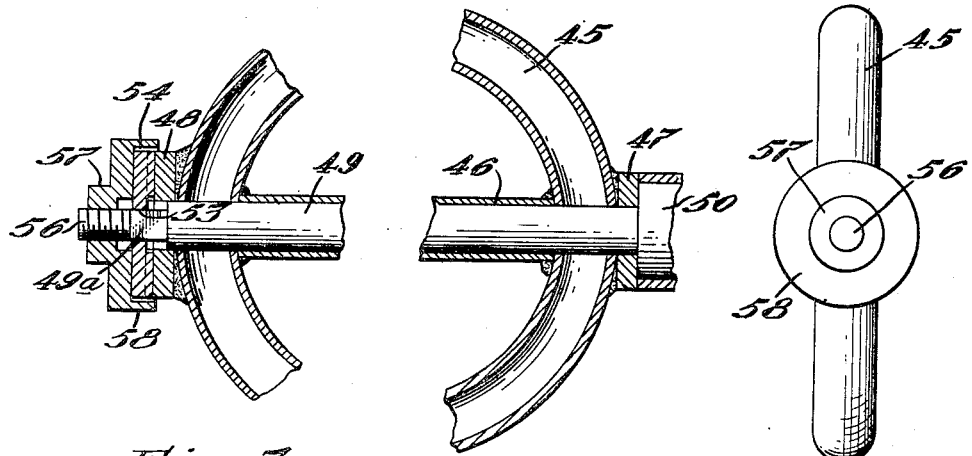
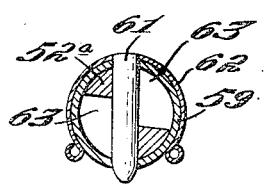
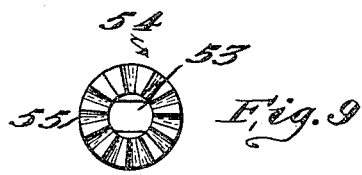

2,690,788

UNITED STATES PATENT OFFICE 2,690,788

PORTABLE SUPPORT

Butler Ames, Boston, Mass.

Original application January 24, 1945, Serial No. 574,364. Divided and this application April 19, 1949, Serial No. 88,321

2 Claims. (Cl. 155—22)

This invention pertains to portable supports for individuals unable to walk or to bear their full weight on their legs, for example persons who have lost the use of both legs; aged persons; or convalescents, and relates more especially to an improved support of the kind disclosed in United States patent to Ames No. 2,282,689, dated May 19, 1942, and in a copending application for Letters Patent, Serial No. 574,364, now Patent No. 2,469,-359, filed January 24, 1945, of which this is a division.

In the foregoing application there is shown and described a support consisting of a metal frame fabricated of stiff and light but rigid tubing, having side parts and a back part which are hinged together for folding to collapse the support, the parts when set up for use with the side parts substantially parallel and at right angles to the back part providing on the one hand a seating space for the occupant in which there is disposed a seat upon which the occupant may rest and on the other hand when the seat is retracted a standing space in which the occupant may stand with the aid of crutches the latter being inserted in crutch staff sockets carried by the side parts of the frame. Wheels are provided on the side parts so that the support may be propelled along, for example, by foot when the occupant is using the crutches, for supporting himself and there are hand operable propelling means associated with the forward wheels for use in propelling the support when the occupant is seated.

The principal objects of the present invention are to provide an improved foot supporting means for the feet of a seated occupant which will afford the maximum degree of comfort regardless of the length of the legs and their encumbrance. As illustrated a foot support is situated at each side of the forward edge of the seat and includes a foot rest swingably connected by an arm to the side part of the frame to be moved from an operative position extending generally forwardly and downwardly from the seat wherein the occupant is seated so that while seated he may place his feet thereon to an inoperative position wherein the foot rest is retracted to an out of the way position to clear the space between the side parts of the frame for an occupant using crutches and propelling the support by foot. The upper portion of the arm is adjustable in its operative position to take up and to be secured in any of a plurality of angular positions by a clutch member associated therewith and a knurled screw rotatable to control the clutch. The arm has at its lower end a telescoping section permitting adjustment in its overall length the latter being angularly adjustable about the longitudinal axis of the arm. The foot rest is generally elliptical in shape, is attached to the lower end of the lower telescoping section substantially at right angles thereto for tilting adjustment about a substantially horizontal axis, and there is a clutch device for fixing the foot rest at any selected position of angular adjustment relative to the horizontal axis.

The invention will now be described in greater detail with reference to the accompanying drawings wherein:

Fig. 3 is a fragmentary vertical section, to larger scale, substantially on the line 3—3 of Fig. 2 showing the adjustment for the upper end of the arm which carries the foot rest;

Fig. 4 is a fragmentary elevation showing the inner side of the foot rest supporting bracket;

Fig. 5 is a fragmentary elevation showing the upper end of the foot rest supporting arm;

Fig. 6 is a horizontal section substantially on the line 6—6 of Fig. 3;

Fig. 7 is a fragmentary plan elevation view, partly in horizontal section, showing a preferred form of foot rest;

Fig. 8 is an elevation of the foot rest of Fig. 7 viewed from the left-hand side of the latter figure; and Fig. 9 is an elevation of a clutch element forming a part of the foot rest structure.

As in the patent above referred to and in said copending application, the portable support of the present invention is of foldable type so that it may be compactly arranged for ease in transporting and storing it, but when in use is rigid and affords adequate support for the occupant.

Figure 1:
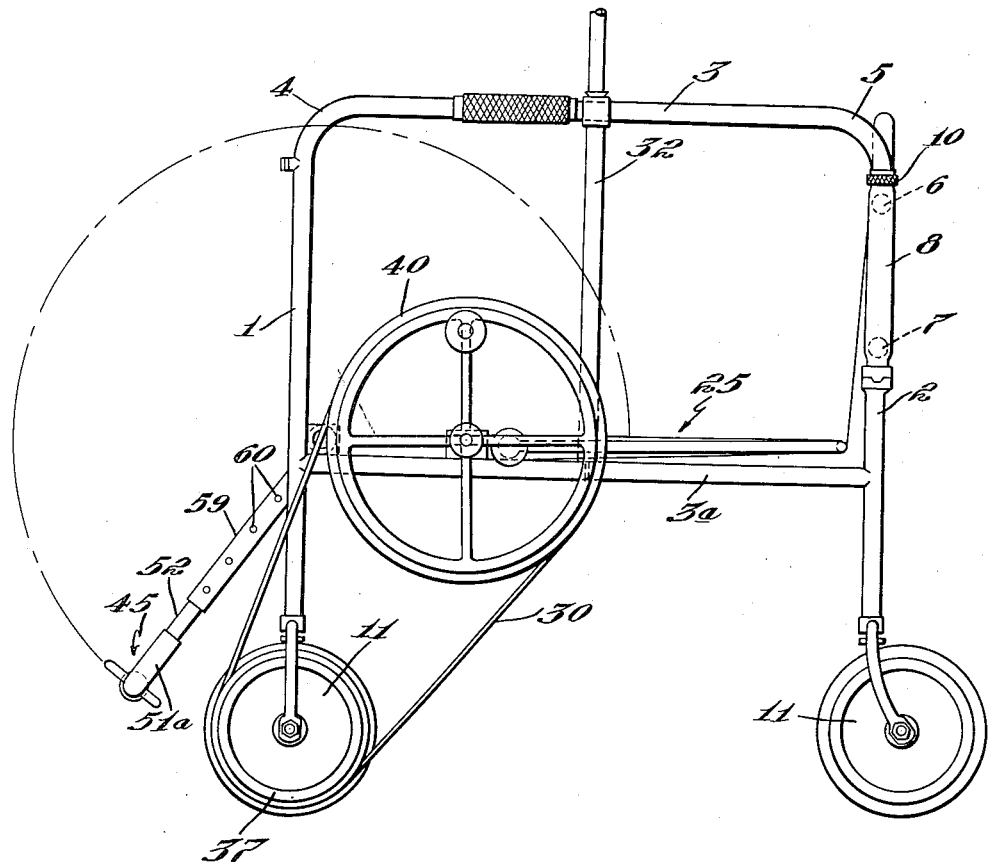
Fig. 1 is a side elevation of the improved support showing the foot supporting means extending downwardly and forwardly from the front rail of the seat of the support in an operative position.
Figure 2:
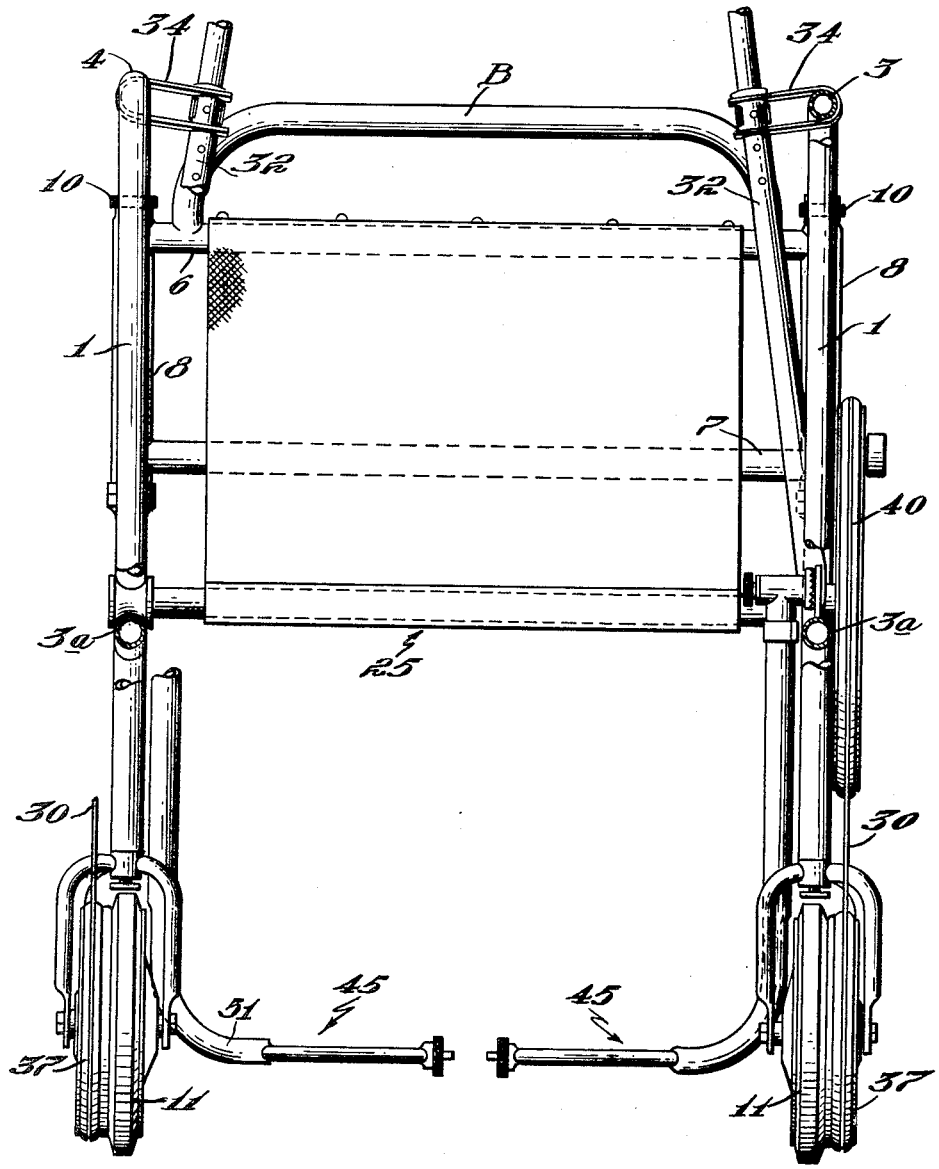
Fig. 2 is a front elevation of the support to larger scale than Fig. 1 but with certain parts broken away, omitted, or in section, showing the left foot supporting means extending inwardly from the left side part of the support.

As herein illustrated, the support comprises two substantially like side part supporting units which, when the device is in use, are disposed in substantially parallel vertical planes and which are united by a rigid back part. Each of these side parts comprises front and rear legs 1 and 2 (Fig. 1), preferably made of stiff, rigid but thin metal tubing; a top or hand-supporting bar 3, preferably approximately horizontal and which is united by smooth bends 4 and 5 with the upper ends of the legs 1 and 2; each side part also comprising a rigid stretcher bar 3a spaced below the hand-supporting rail 3 and preferably parallel to the latter and which is rigidly united, for example, by welding at its opposite ends, to the legs 1 and 2. The back part (Fig. 2) also comprises vertically spaced upper and lower, substantially horizontal bars or rails 6 and 7 which are rigidly united, as by welding at their opposite ends, to hinge sleeves 8 (Figs. 1 and 2) forming bearings within which the rear legs 2 of the side parts may turn. The sleeves, with the portions of the legs which they embrace, constitute hinge connections between the back and side parts. Preferably these hinge connections are of the kind more fully disclosed in the aforesaid patent to Ames, No. 2,282,689, being so devised that when the knurled hand nut 10 (Fig. 2) is loosened, the sleeves may be turned relatively to the legs 2 to permit the two side parts to be swung so as to lie in substantially parallel planes. When, on the other hand, after having disposed the supporting side parts in operative relation, the nuts 10 are tightened, the hinge connections are locked so as to hold the two side parts in substantially parallel operative relation and at right angles to the plane of the back part.

In the present arrangement a bow-shaped back rest B is fixed to the rail 6, the transverse member of the back rest preferably being approximately in the same horizontal plane as the hand-supporting bars 3 of the supporting units.

Each leg 2 of the foregoing support is provided with a wheel 11 preferably having a resilient tire and there are propelling means for each of the front wheels in the form of a hand wheel 40 connected by a driving band 30 to a pulley 37 associated with the wheel and by rotation of which the wheels may be driven.

Between the side parts there is suspended a retractable seat 25 including a rigid seat frame covered with a flexible fabric, the forward edge of the seat frame resting on the stretcher bars 3a the seat being adapted to be lifted off the bars 3a and moved to an out-of-the-way position when not wanted as is clearly described in the foregoing application. Also in accordance with the foregoing application, crutch staff sockets 32 are hingably connected at their lower ends to the stretcher bars 3a and secured at their upper ends to the bar 3 by brackets 34 to permit free swinging of the sockets toward and away from each other so as to accommodate occupants of different size.

Forwardly of the front edge of the seat and secured as will appear hereinafter to the stretcher bars 3a is a pair of independent foot rests 45 which form the subject matter of the present invention. Each of these foot rests is preferably of generally elliptical shape in plan view (Fig. 7) and comprises a rim portion of hollow tubing and a transversely extending portion 46 also of hollow tubing and extending along the major axis of the ellipse, the part 46 preferably being welded at its opposite ends to the rim. Preferably annular members or washers 47 and 48 are welded to the outer surfaces of the rim at diametrically opposite ends of the rim and in coaxial relation to the member 46, the annular members 47 and 48 having outer surfaces lying in planes substantially perpendicular to the axis of the part 46.

A spindle 49 extends through the part 46 and through aligned openings in the rim of the foot rest, one end of the part 49 being integral with or permanently united to a plug 50 which is disposed within and permanently united, as by welding, to the lower substantially horizontal leg 51 of an angle member formed of thin stiff tubing having a substantially vertical leg 51a in which is fixedly secured the lower end of the elongate supporting stem 52.

The opposite end of the spindle 49 is preferably flattened or slabbed off on opposite sides, as shown at 49a and passes through a substantially rectangular slot 53 in a clutch disk 54. This clutch member 54 (Fig. 9) has radial teeth 55 on its inner face designed to engage similar teeth on the outer radial face of the annulus 48, the latter being fixed as by welding to the rim of the foot rest as above described. The outer end portion of the square spindle 49 is turned down so as to be cylindrical and screw threaded at 56 and receives an internally screw-threaded nut 57 having a rim portion 58, preferably knurled for manual manipulation of the nut. By screwing this nut 57 inwardly along the spindle 49, the clutch member 54 may be engaged with the teeth on the part 48, thus locking the foot rest to the spindle 49. On the other hand, by loosening the nut 57, the clutch disk 54 may be separated from the part 48, thus permitting the foot rest to be turned relatively to the spindle 49 so as to adjust the foot rest to lie at any desired angle to the horizontal.

The foot rest supporting stem section 52 is provided near its upper end with a solid plug 52a (Fig. 3) provided with a transverse aperture and with slots 63 extending into said aperture and extending peripherally of the plug for distances of approximately 105°. The stem 52, with its plug 52a, telescopes within a tubular arm member 59, having a series of spaced apertures 60 (Fig. 1) designed to receive a pin 61 (Fig. 3) preferably secured at one end to a spring clip 62 designed partially to embrace the member 59. By removing the spring clip and pin 61, parts 52 and 59 may be adjusted relatively to each other to lengthen or shorten the arm as a whole and may then be held in desired position of adjustment by inserting the pin 61 through any selected opening 60a and through the opening in the plug 52a. However, when the pin is thus in place, the part 52a may be turned relatively to the part 59 to the angular extent permitted by the slots 63. The position of the foot rest may thus be adjusted for the comfort of the occupant.

The upper end of the arm member 59 is rigidly secured, for example by welding, to sleeve member 64, provided at one end with radial clutch teeth 66 (Fig. 5) in its outer face. These clutch teeth are designed to engage similar radial teeth 67 (Fig. 4), formed on the inner surface of a bracket member 68, rigidly secured to the corresponding stretcher bar 3a. A spindle 69 is arranged within the sleeve member 64 and is provided with a head 70 at one end of an external diameter somewhat greater than that of the body of the spindle 69. The bracket 68 is provided with a slot 68a extending downwardly from its upper edge and transversely of the annular series of teeth 67, the end portion of the spindle 69 just to the left of head 70 (Fig. 3) being slabbed off or flattened at 69b so that this end portion may be fit down into the slot 68a of the bracket 68. The opposite end of the spindle 69 is provided with a portion 71 of reduced diameter, externally screw threaded and engaged by a manually actuable nut 72, the inner end of the latter bearing against an annular plate or washer 73 closing the end of the sleeve 64. A screw 74 may be provided for holding the nut 72 in adjusted position. By loosening the nut 72, it is possible to move the sleeve 64 to the left as viewed in Fig. 3, so as to separate the clutch teeth 66 and 67, thus permitting the member 59 to be swung from front to rear about the axis of the spindle 69. When swung to the desired position, the nut 72 may be tightened thus holding the foot rest in the desired position of adjustment.

If it is not desired to use the foot rests, the nuts 72 may be loosened, and the foot rest stems 52 with the parts 59 swung upwardly and rearwardly until the foot rests engage the rear member of the support. If, at the same time the seat be folded back, the entire interior of the support is thus left free for an occupant who wishes to walk, either with the assistance of the crutches or merely by resting his hands on the top rails 3.

While certain desirable features of improvement and invention have herein been disclosed by way of example, it is to be understood that the invention is not necessarily limited to these specific features, but is to be regarded as broadly inclusive of any modifications and rearrangement of parts and the substitution of equivalents such as may fall within the scope of the appended claims.

I claim:

1. In a portable support of the kind having a pair of spaced side frames, a back frame hinged to the side frames so that the sides and back may be folded into substantially parallel relation to the back, and a seat interposed between the side frames, said seat being movable from a horizontal position between the sides to a vertical position parallel with the back, a foot rest and a supporting leg connected to each side frame, each leg having telescoping parts slidably engaged to permit adjusting its length, means for fixing the parts at a selected position, a bracket fast to each side frame having a hole through it, a spindle mounted on the bracket so as to project horizontally inward from the side frame, said spindle having a head which is adapted to engage the substance of the bracket bordering the hole at one side thereof, a sleeve fast to the upper end of each leg, said sleeve being rotatably mounted on the spindle and having an end portion of it adapted to bear against the substance of the bracket bordering the hole at the opposite side from said spindle head, a nut threaded on the spindle having a portion which bears against the other end of the sleeve and by rotation of which the sleeve and the head of the spindle may be drawn into clamped engagement with opposite sides of the bracket to fix the angular position of the leg on the spindle, means pivotally securing a foot rest to the lower end of each leg for tilting movement about a horizontal axis parallel to the spindle, and means at the lower end of each leg for fixing the angular position of the foot rest with respect to the leg.

2. In a portable support of the kind having a pair of spaced side frames, a back frame hinged to the side frames so that the sides and back may be folded into substantially parallel relation to the back, and a seat interposed between the side frames, said seat being movable from a horizontal position between the sides to a vertical position parallel with the back, a foot rest and a supporting leg for each side frame, each leg having telescoping parts slidably engaged to permit changing its length, means for fixing the parts at a selected position, means pivotally connecting an end of one leg to each side frame for swinging movement in a vertical plane about a horizontal axis extending transversely between the sides, a spindle made fast to the lower end of each leg which extends horizontally inward therefrom, a bearing member rotatably mounted on the spindle, an annulus fast to the bearing member and rotatable therewith to tilt the annulus with respect to the horizontal axis of the spindle, a pair of clutch elements, one fast to the bearing member and the other splined to the spindle and a nut threaded on the spindle, said nut being rotatable to squeeze the clutch elements into locking engagement to fix the plane of the annulus at any desired angular position with respect to the leg.

References Cited in the file of this patent

UNITED STATES PATENTS

| Number | Name | Date |
|---|---|---|
| 205,002 | Sheldon | June 18, 1878 |
| 244,570 | Dutton | July 19, 1881 |
| 531,330 | Potter | Dec. 25, 1894 |
| 2,102,336 | Roe | Dec. 14, 1937 |
| 2,236,089 | Ducavich | Mar. 25, 1941 |
| 2,282,689 | Ames | May 12, 1942 |
| 2,312,602 | Taylor | Mar. 2, 1943 |